F. C. WARNE.
FLEXIBLE HARROW.
APPLICATION FILED OCT. 1, 1914.

1,130,225.

Patented Mar. 2, 1915.

Inventor
FREDERICK C. WARNE

Witnesses
A. D. Schrader
F. C. Adams

By Fred E. Billman, Attorney

UNITED STATES PATENT OFFICE.

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

FLEXIBLE HARROW.

1,130,225.  Specification of Letters Patent.  Patented Mar. 2, 1915.

Application filed October 1, 1914. Serial No. 864,378.

*To all whom it may concern:*

Be it known that I, FREDERICK C. WARNE, a citizen of the United States, residing at Mansfield, in the county of Richland and State of Ohio, have invented certain new and useful Improvements in Flexible Harrows, of which the following is a specification.

My invention relates to improvements in flexible harrows, and more particularly to that class or type which are adapted to be collapsed or folded up so as to occupy but little space in shipment or transportation and at the same time protect the harrow teeth from injury either by contact with each other or by engagement with external objects.

The primary object of the invention is to provide a generally improved harrow of this class by the provision of improved link connecting bearing members adapted to detachably connect the ends of the links or reach rods and by engagement with the latter limit the rocking movements of the transversely extending tooth carrying bars whereby when the flexible harrow is drawn from one end the teeth will stand at right angles to the line of draft for the normal or pulverizing operation of the harrow, and when drawn from the other end, the teeth will be permitted to assume a slanting position rearwardly as in clearing the harrow teeth of trash, smoothing, and for transporting the harrow for short distances.

A still further object is to provide a more perfect flexibility between the parts and yet carry the teeth in a uniform position relative to the line of draft by the provision of improved link or reach rod connecting bearing members adapted to eliminate friction and at the same time form a more perfect bearing connection between the adjacent links or reach rods.

A still further object is to improve and simplify the assemblage of the parts.

With the above mentioned and other ends in view, the invention consists in the novel construction, arrangement, and combination of parts hereinafter described, illustrated in one of its embodiments in the accompanying drawings, and particularly pointed out in the appended claims.

Figure 1:
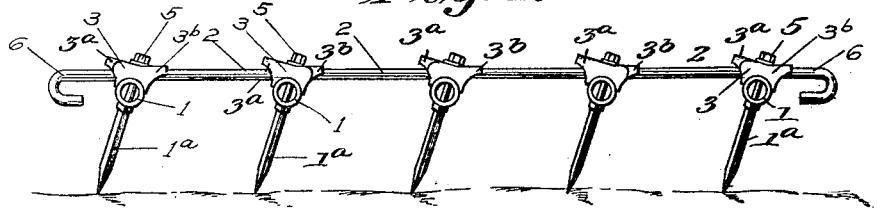
Figure 2:
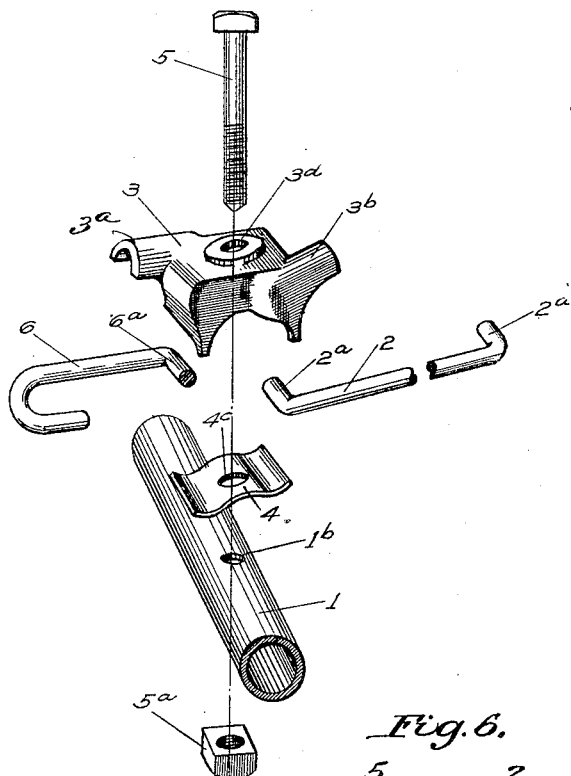
Figure 3:
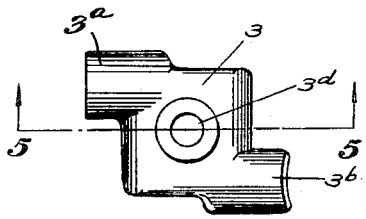
Figure 4:
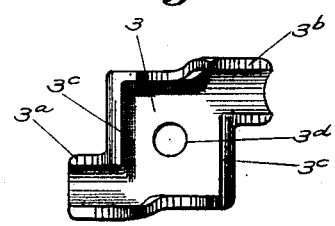
Figure 5:
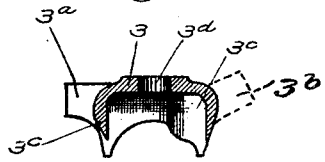
Figure 6:
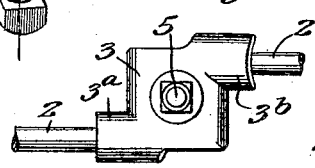

Referring to the drawings, forming a part of this specification, Figure 1, is a side elevation of a flexible harrow constructed in accordance with this invention, the teeth being shown slanted rearwardly from the end of draft. Fig. 2, a detached isometric view of one of the improved link bearing members or clips and illustrating the relative position and manner of assembling the same with the adjacent parts, including a link and draft hook, such as shown at the ends of the harrow in Fig. 1. Fig. 3, a detailed top plan view of the improved bearing or clip, detached. Fig. 4, an inverted or under side view of the same. Fig. 5, a sectional view of the same taken on line 5—5 of Fig. 3. Fig. 6, a top plan view of the next or adjacent oppositely formed clip on the next tooth carrying bar and illustrating the staggered arrangement of the links or reach bars.

Similar numerals of reference designate like parts throughout all the figures of the drawings.

The improved harrow comprises a plurality or series of transversely extending tooth carrying bars 1, which, in the present instance, are in the form of tubular or pipe members, said bars being armed with suitable harrow teeth $1^a$, which latter may be of any suitable and convenient form.

As a means of flexibly connecting the tooth carrying bars 1, as well as providing means whereby a limited flexible movement is permitted between the tooth carrying bars 1, and the connecting members, a plurality of links or reach rods 2, are provided, said reach rods being arranged in staggered relation and terminating at their ends in link bearing ends or portions $2^a$, preferably bent at right angles as shown, and adapted to be detachably and flexibly connected to each other by means of improved link connecting bearing members or clips 3. The connecting bearings or clips 3, are each provided with oppositely extending link receiving stop members $3^a$, and $3^b$, respectively, preferably disposed at diagonally opposite corners of the clip and terminating in link bearing portions $3^c$, to receive and contain the angularly extending bearing portions $2^a$, of the link or reach bars 2, As a means of retaining the bearing portions 2ª, of the links in proper seated position within the link bearing portions 3ᶜ, underneath the clips 3, link retaining or auxiliary clips 4, are provided, said retaining clips 4, being superposed beneath the open or under side of the clips 3, and between the latter and the subjacent tooth carrying bars 1, and as a means of detachably securing the clips 3 and 4, in assembled position upon the bars 1, as well as retaining the bearing ends 2ª, of the links 2, in proper relative position, attaching bolts 5, and nuts 5ª, are adapted to be passed through registering openings 3ᵈ, 4ª, and 1ᵇ, of the clips 3 and 4, and tooth bars 1, respectively, as shown and illustrated most clearly in Fig. 2 of the drawings.

The draft hooks 6, at opposite ends of the harrow are provided with bearing ends 6ª, and are secured within the clips in a manner similar to the bearing ends 2ª, of the links, and it is apparent that since the link stop members 3ª, extend upwardly and the stop members 3ᵇ, extend substantially horizontal relative to the horizontal planes of the clips 3, that when the harrow is drawn in one direction the tooth carrying bars 1, may be permitted to tip upon their axes whereby the teeth may assume a rearwardly extending position as illustrated in Fig. 1 of the drawings, and that when the harrow is drawn in the opposite direction, the bars 1, when tipped will bring the teeth 1ª, in a substantially vertical position or at right angles to the links 2, as in the normal operation of the harrow in pulverizing the soil, as desired in this class or type of harrows.

From the foregoing description, taken in connection with the accompanying drawings, the operation and advantages of my invention will be readily understood.

Having thus described one of the embodiments of my invention, what I claim and desire to secure by Letters Patent, is,—

1. A flexible harrow, comprising transversely extending tooth carrying bars, link connecting bearings detachably mounted thereon, connecting links detachably mounted in said bearings and having a limited movement therein, and link retaining plates beneath said bearings and links.

2. A flexible harrow, comprising tooth carrying bars, link connecting bearing members mounted thereon, connecting links having bearing ends mounted beneath said bearing members, link retaining plates mounted beneath the bearing ends of said connecting links, and attaching bolts extending through said tooth carrying bars and said bearing members and retaining plates.

3. A flexible harrow, comprising transversely extending tooth carrying bars, link retaining auxiliary clips mounted thereon, link members mounted on said clips, and link connecting bearing clips mounted above said link retaining auxiliary clips and provided with oppositely extending stop members adapted to receive and coöperate with said link members.

4. A flexible harrow, comprising tooth carrying bars, a plurality of links having their ends bent at right angles thereto, link connecting and retaining members receiving the angular ends of said links and having a limited movement with respect to the latter, and attaching elements for securing said parts in assembled position upon said tooth carrying bars.

5. A flexible harrow, comprising tooth carrying bars, link retaining clips mounted above the same, link members provided with right angled bearing portions resting on said link retaining clips, link connecting clips mounted above said link retaining clips and provided with oppositely arranged stop and bearing portions receiving said links and link bearing portions, respectively, and attaching elements securing said parts in assembled position.

6. In a flexible harrow, the combination with a plurality of tooth carrying bars, and link connecting bearing members detachably secured above the same; of a plurality of links mounted beneath said link connecting bearing members and having a limited movement therein, and link retaining clips interposed between the ends of said links and said tooth carrying bars whereby said links are retained within said link connecting bearing members.

7. A flexible harrow, comprising tooth carrying bars, link retaining auxiliary clips mounted thereon, links provided with right angled bearing portions resting on said auxiliary clips, link connecting bearing clips provided on their under sides with link bearing portions and at their opposite corners with link receiving stop members extending at different angles whereby said harrow teeth are permitted to assume different angles according to the direction of travel of the harrow, and attaching elements for securing said clips and links in assembled position above said tooth carrying bars.

8. A flexible harrow, comprising tooth carrying bars, link retaining clips mounted above the same, connecting links provided with right angled bearing ends normally resting on said link retaining clips, link connecting bearing members mounted above said link retaining clips and provided with oppositely arranged link receiving stop members extending at different angles and also provided on their undersides with link bearing portions receiving and containing said right angled bearing ends of said links, attaching bolts extending through said clips and bearing members between said right angled bearing ends of said links and through said tooth carrying bars whereby said parts are secured in assembled position.

In testimony whereof I have affixed my signature in presence of two witnesses.

FREDERICK C. WARNE.

Witnesses:
A. B. McLEAN,
C. A. HINES.

Copies of this patent may be obtained for five cents each, by addressing the "Commissioner of Patents, Washington, D. C."